(Specimens.)

J. BARNES.
CONFECTIONERY.

No. 364,332. Patented June 7, 1887.

B $x$ — — $x$
B  y

B  A

B  A

Witnesses

Inventor.
Joshua Barnes
by A. W. Almquist
Attorney

UNITED STATES PATENT OFFICE.

JOSHUA BARNES, OF BROOKLYN, NEW YORK.

CONFECTIONERY.

SPECIFICATION forming part of Letters Patent No. 364,332, dated June 7, 1887.

Application filed September 2, 1886. Serial No. 212,559. (No model.)

*To all whom it may concern:*

Be it known that I, JOSHUA BARNES, a citizen of the United States, and a resident of Brooklyn, in the county of Kings and State of New York, have invented a new and useful Improvement in Confectionery, of which the following is a specification.

My invention relates to confectionery in general, but more especially to candied sweet-meats, or such as are preserved by sugar, and has for its object to provide an improved confection of licorice, whereby the same will retain a constant and uniform degree of consistency at all ordinary variations of temperature and moisture.

The improved article consists of a licorice bar or piece thereof inclosed by a crust or coating of sugar, as will be hereinafter described and claimed.

Figure 1:
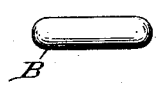
Figure 2:
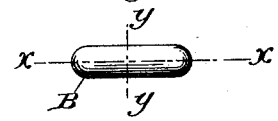
Figure 3:
Figure 4:

In the accompanying drawings, Figures 1 and 2 represent outside views of two licorice lozenges of different sizes and according to my improvement. Fig. 3 is a cross-section of the same on the line $y\ y$ of Fig. 2. Fig. 4 is a longitudinal section on the line $x\ x$.

The inner and main portion, A, consists of a piece of licorice molded into the desired size and shape, or cut from an ordinary licorice bar.

B is an outer coating or crust of sugar completely covering and inclosing the licorice A.

In order to make the crust tight, hard, and smooth, the sugar to be used for it should be ground very fine. The process of applying the sugar is the same as usual in sugar-coating pills, almonds, &c.

It is well known that licorice when not protected, as aforesaid, is very susceptible to changes of moisture and temperature. Moderate heat or moisture alone, or both combined, render it soft and adhesive. Very dry weather or cold makes it hard and brittle; but sugar-coating protects it from atmospheric influences, conserving its consistency, so that it may be shipped to any clime and remain unaltered in quality, and may be carried in a person's pocket without getting sticky, &c. Moreover, notwithstanding the labor of sugar-coating, the article is cheaper, weight for weight, than the uncoated bar-licorice, owing to the less expense of sugar.

Having thus described my improvement, what I claim as new, and desire to secure by Letters Patent, is—

1. Sugar-coated licorice, as a new article of manufacture.

2. A lozenge consisting of a molded piece or bar of licorice having an exterior crust of sugar.

In testimony that I claim the foregoing as my invention I have signed my name, in presence of two witnesses, this 30th day of August, 1886.

JOSHUA BARNES.

Witnesses:
A. W. ALMQVIST,
HELMER WESTEEN.